No Printed Specification Available
9508X
J. C. GENTRY.
Grain Mill.
Patented Mar. 18, 1836.
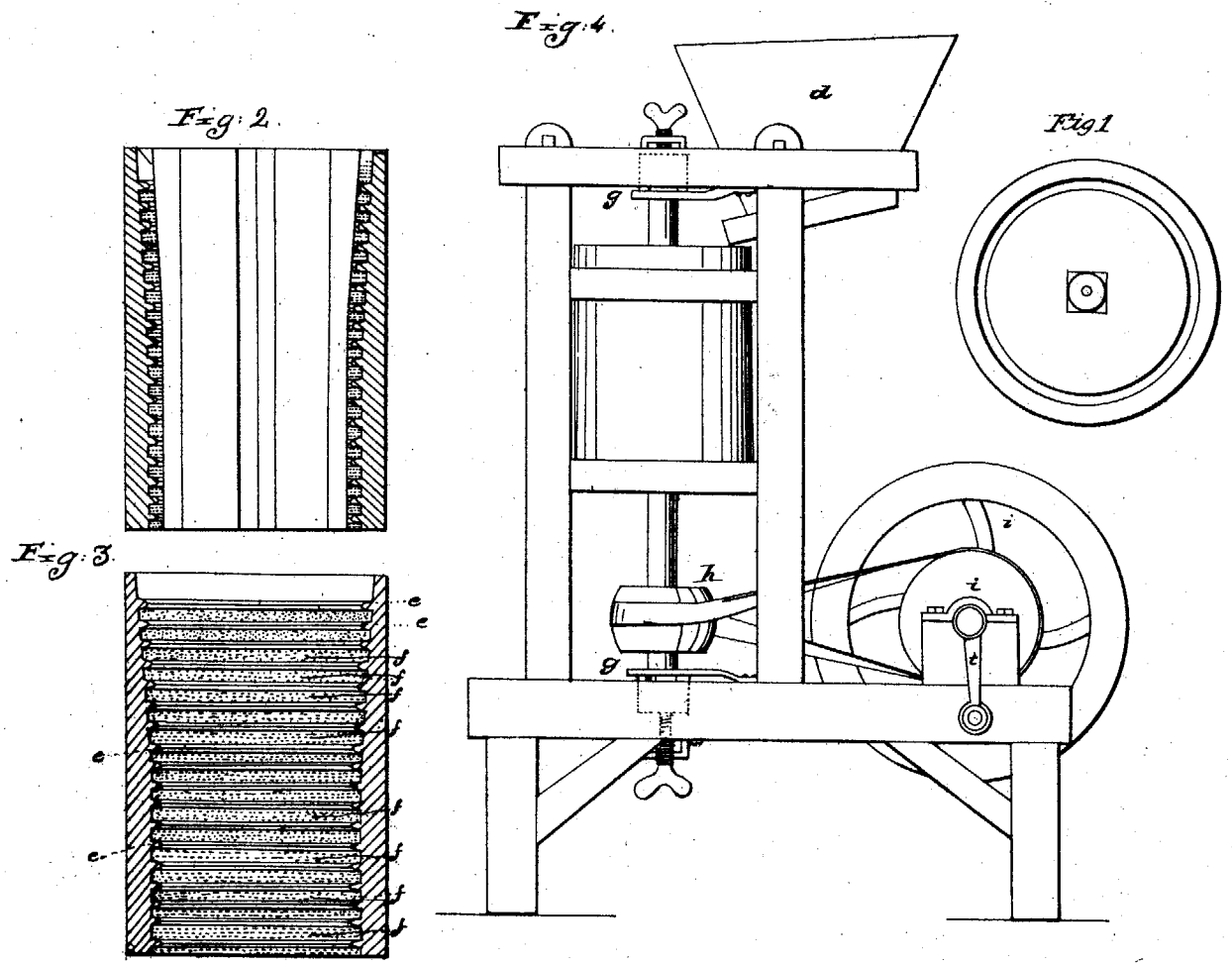
THE NORRIS PETERS CO., PHOTO-LITHO., WASHINGTON, D. C.

9508X 3-18-1836

Joseph C Gentry of Dayton Ohio

Letters Patent.

The Schedule referred to in these Letters Patent and making part
of the same containing a description in the words of the said Joseph
C Gentry himself of his Improvement in the metallic Mill for grind
ing Grain and other substances.

To all to whom these presents shall come: Be it known that
Joseph C Gentry of Dayton in the County of Montgomery and State
of Ohio, have invented a new and useful machine which I denom
inate "Gentry's Metallic Mill" for Grinding all kinds of Grain, and
other materials usually ground upon Mills, and which I describe as
follows Viz. The "Gentry Metallic Mill" is constituted of one metal
cylinder of any dimensions, the body of the cylinder to be composed of cast
Iron, corked and plated or banded exteriorly with cast steel, or any other suit
able metal, and turned to a true surface: and a metallic Concave,
(with steel plates inserted), with a smooth interior surface, being
of the same length of the cylinder, and nearly of the same curve, and
so formed as that the interior surface shall nearly correspond to half
the circumference of the exterior surface of the cylinder, varying
from such corresponding circle only, from a point to commence about
half way, from the lower edge of it when placed horizontally against
the cylinder: and the variation from that point up: to be such as
to admit the various kinds of grain to be introduced above; whilst the
other portions of the concave are near enough to the cylinder to gradu
ally reduce the grain to flour or meal. This cylinder and concave
are to perform the operation of grinding. The concave being perma
nently placed in a frame of wood or iron, and the cylinder so con
nected with it as to turn within it. The concave being placed in
such relation to the cylinder that the person tending the mill, may
by turning screws at its top and bottom, set the mill to grind coa
rse or finer as he may desire. A hopper and shoe are to be placed
above, to hold and introduce the grain &c. The interior surfa 9508X 3-18-1836 of the concave is to be so cast as to receive the cast steel or other metalic ribs at small intervals, These Ribs being formed in the manner of a dove tail, to be driven into the grooves, left in the castings, and mad to project their surfaces, about one sixteenth of an inch beyond the in ner smooth surface of the concave, The smooth surfaces, both of the ribs in the concave and the cylinder, are to be picked by a cast steel pick so as to produce serrated surfaces to each other. For the purpose of avoiding any injury which these surfaces might sustain from any for eign substance which might accidentally be introduced into the mi a stiff spring is placed at each box in which the cylinder runs, whi springs will yeild to any resistance offered by substances of the kind refered to, and will enable them to pass through the mill without of feeling an injury. At either or both ends of the shaft which passes through the cylender there is a pully to attach the mill to the driving power. What I claim as my invention, discovery or improve ment in the above machine, is the steel or other metalic ribs, an the manner of fixing them in the concave, and the cast steel or othe suitable metal plated or banded on the cast cylinder. The man ner of relieving the action of the cylinder by springs back of the box, on which the journals rest. The manner of picking the cylinder an ribs presenting the sharp edges to each other as described above Witnesses

[illegible] Amos A Richards.

[illegible] James Plunket.

Joseph C. [illegible]

Drawings made. (B)

(689 words